United States Patent [19]
Fontana et al.

[11] Patent Number: 5,381,426
[45] Date of Patent: Jan. 10, 1995

[54] ACTIVE-MODE-LOCKING OPTICAL-FIBER LASER GENERATOR

[75] Inventors: Flavio Fontana, Cormano; Sergio Bosso, Asti, both of Italy

[73] Assignee: Pirelli Cavi S.p.A., Milan, Italy

[21] Appl. No.: 180,878

[22] Filed: Jan. 12, 1994

[30] Foreign Application Priority Data

Feb. 19, 1993 [IT] Italy ............... MI93 A 000325

[51] Int. Cl.⁶ ............................................. H01S 3/098
[52] U.S. Cl. .................................. 372/18; 372/26; 372/12; 372/6
[58] Field of Search ............... 372/18, 6, 12, 26

[56] References Cited

U.S. PATENT DOCUMENTS

| | | | |
|---|---|---|---|
| 4,904,041 | 2/1990 | Izadpanah | 372/18 |
| 5,054,027 | 10/1991 | Goodberlet et al. | 372/18 |
| 5,200,964 | 4/1993 | Huber | 372/6 |
| 5,210,631 | 5/1993 | Huber et al. | 372/6 |
| 5,243,610 | 9/1993 | Murata | 372/18 |
| 5,285,309 | 2/1994 | Endoh et al. | 372/18 |
| 5,309,453 | 5/1994 | Treacy | 372/18 |

FOREIGN PATENT DOCUMENTS

| | | | |
|---|---|---|---|
| 0469259A3 | 2/1992 | European Pat. Off. | H01S 3/106 |
| 4138222 | 12/1992 | Germany | G01N 21/45 |

OTHER PUBLICATIONS

Proceedings II Topical Meeting on Optical Amplifiers, OSA, 1991 Snowmass Village, Co., USA pp. 116–119.
Optics Letters, vol. 16, No. 6, 15 Mar. 1991, New York US, pp. 387–389.
Patent Abstracts of Japan–vol. 016, No. 451 18 Sep. 1992 & JP-A-41 59 516 (NEC Corp) 2 Jun. 1992 Abstract.
Patent Abstracts of Japan–vol. 016, No. 053 10 Feb. 1992 and JP-A-32 52 618 (Fujitsu Ltd.) 11 Nov. 1991 Abstract.
Electronics Letters vol. 28, No. 14, 2 Jul. 1992 Enage GB pp. 1291–1293, F. Fontana et al.

*Primary Examiner*—Leon Scott, Jr.
*Attorney, Agent, or Firm*—Brooks Haidt Haffner & Delahunty

[57] ABSTRACT

An active mode-locking pulse laser generator comprising:
an active fibre doped with a fluorescent dopant;
active-fibre pumping means;
a modulator to be driven from the outside, connected in series to said active fibre;
a wavelength selecting filter, to be driven from the outside, connected in series to said active fibre;
means for drawing an emission signal from said active fibre;
means for defining a laser cavity including the active fibre, pumping means, modulator, filter, and signal drawing means, wherein the drivable modulator is adapted to generate a modulation of the emission signal generated by the active fibre, such as to cause a mode-locking of the oscillating emission signal in the cavity, wherein the wavelength selecting filter consists of an optical-waveguide monolithic filter, in the absence of components subjected to spatial-configuration modifications.

24 Claims, 4 Drawing Sheets t(mS)

ACTIVE-MODE-LOCKING OPTICAL-FIBER LASER GENERATOR

Under many circumstances in the telecommunications field it is desirable to obtain pulse laser emissions of a particularly limited duration.

Pulses of the above kind having a duration $\delta t < 100$ ps, commonly referred to as very short pulses or "solitons" (under guided propagation conditions), apply in particular to high speed digital telecommunications (up to 10 GBit/s) and in addition to the accomplishment of optical instruments, tests on semiconductor components and also to remote measurements, in topography or in the atmospheric radar field for example.

To this end, mode-locking pulse laser generators are known; by mode-locking it is meant a process by which, in a laser, several modes oscillate in a mutual constant-phase relationship, by effect of a non-linear-behaviour element present in the laser cavity.

Mode-locking laser generators of the passive type are known which comprise optical-fibre laser devices using erbium doped fibres (the laser shown in FIG. 8, for example) in which a fibre ring containing an optical amplifier, acts as a saturable absorber, for example to the wavelength of 1.5 $\mu m$; pulses generated in these lasers depend on the laser ring size.

Devices of the above kind are described for example in ELECTRONICS LETTERS, vol. 26, No. 6, Mar. 14, 1991 p. 542-543, by D. J. Richardson, R. I. Laming, D. N. Payne, V. Matsas, M. W. Phillips, in ELECTRONICS LETTERS, vol. 27, No. 9, Apr. 25, 1991, p. 730-732, by the same authors, in ELECTRONICS LETTERS, vol. 27, No. 6, Mar. 14, 1991, p. 544-545, by I. N. Duling and in ELECTRONICS LETTERS, vol. 27, No. 3, Jan. 31, 1991, p. 229-230, by G. J. Cowle and D. N. Payne.

Optical-fibre laser devices are also known in which an active modulation device of the electro-optical type is inserted in an optical path forming a laser cavity so as to force the laser to generate mode-locking pulses at the desired frequency.

Such devices are referred to as active mode-locking devices because the modulation device present therein operated from the outside acts on the modes generated in the laser, enabling amplification up to a level keeping the laser emission to the only modes selected by the applied modulation.

Devices of the above type are described for example in OPTICS LETTERS, vol. 14, No. 22, Nov. 15, 1989, p. 1269-1271, by J. D. Kafta, T. Baer and D. W. Hall, in ELECTRONICS LETTERS, vol. 26, No. 3, Feb. 1, 1990, p. 216-217, by A. Takada and H. Miyazawa, in CLEO '92 Anaheim, Paper CW14, by C. Harvey and L. Mollenauer, and in PROCEEDINGS OF II TOPICAL MEETING ON OPTICAL AMPLIFIERS, Optical Society of America, 1991, Snowmass Village, Colo., USA, p. 116-119, by T. Pfeiffer and H. Schmuck (SEL Alcatel Research Centre).

Theoretical foundations for mode-locking both of the active and passive type are shown, for example, in WAVES AND FIELDS IN OPTOELECTRONICS, by Herman A. Haus, issued in 1984 by Prentice-Hall, Inc., Englewood Cliffs, N.J., p. 254-290.

Passive mode-locking generators the operation of which leaves out of consideration an exciting modulation, have the particular feature that they have a soliton-pulse emitting frequency closely depending on the physical features of the generator, in particular the sizes of the fibre ring forming the laser system, in which for each reflection a single pulse travels.

In active mode-locking generators, on the contrary, the pulse emitting frequency depends on the exciting frequency of a modulator and it enables a great number of locked pulses simultaneously travelling in the ring to be present and therefore enables the pulse emitting frequency to be previously selected and to be much higher than in the passive-type devices, on the order of GHz for example.

In addition to the foregoing, mode-locking laser generators can be provided with a filter adapted to enable selection of the emission wavelength of the emitted pulses within a given frequency band, in the 1530-1560 nm band for example, which is the band commonly used in telecommunications, both for feeding different sources on the same fibre and for adaptation to the chromatic dispersion features of the fibre in the connected line.

T. Pfeiffer and H. Schmuck (SEL Alcatel Research Centre) in the above mentioned publication have described a ring laser of the above type, comprising an erbium-doped active fibre, a pump laser feeding the optical fibre, an optoisolator, an electrooptical width modulator made of $LiNbO_3$, in which a Fabry-Perot tuning filter has been used for selection of the emission wavelength.

However, based on the applicant's tests, although the described laser is operative in the described experimental conditions, it has proved to be very critical as regards stability in operation.

In accordance with the present invention, the critical behaviour is deemed to be caused by alterations due both to temperature changes and vibrations or the like in the apparatus.

Due to this critical state therefore, a particularly complicated structure from the mechanical point of view is required in order to achieve satisfactory results, which structure is consequently not appropriate for practical use, apart from the mere laboratory experiments.

In accordance with the invention it has been found that a fibre laser using an active erbium-doped optical fibre of the active mode-locking type, capable of wavelength tuning, can have a high operation stability and resistance to mechanical perturbations if it is accomplised in the absence of spatial-movement adjustment devices.

In particular, it has been found that an active mode-locking laser system, in which a filter for tuning the emission wavelength is made in planar optics, enables a high emission stability to be reached in operation even in the absence of specific backing and mechanical-stabilisation structures.

It is an object of the present invention to provide an active-mode-locking pulse laser generator comprising:
  an active fibre doped with a fluorescent dopant;
  means for feeding luminous pumping energy to one end of the active fibre, adapted to excite the fluorescent dopant to a laser emission state, from which said dopant may decay to a base state, the light emission being to a predetermined wavelength constituting an emission signal;
  an electrooptical modulator to be driven from the outside, connected in series to said active fibre;
  a wavelength selecting filter, to be driven from the outside, connected in series to said active fibre;

means for drawing said emission signal from said active fibre;

means for defining a laser cavity including the active fibre, means for feeding pumping energy, modulator, filter, and drawing means, wherein the drivable modulator is adapted to generate a modulation of the emission signal generated by the active fibre, such as to cause a mode-locking of the oscillating emission signal in the cavity, characterized in that said wavelength selecting filter consists of an optical-waveguide monolithic filter on a crystal substrate, in the absence of components subjected to spatial-configuration modifications.

Preferentially, said fluorescent dopant in the active fibre is erbium.

In particular, the means for feeding pumping energy comprises a dichroic coupler connected to one end of the active fibre and to a pumping laser of predetermined wavelength.

In a particular embodiment the electrooptical drivable modulator is a Mach-Zehnder intensity modulator having an optical channel-shaped waveguide, associated with an electronic preselectable-frequency generator.

In an alternative embodiment the drivable electroptical modulator is a phase modulator having an optical channel-shaped waveguide associated with an electronic preselectable-frequency generator.

In particular, the filter for selection of the wavelength is an acoustooptical filter and, more particularly, the acoustooptical filter is a filter having an optical channel-shaped waveguide made of lithium niobate with a lithium niobate crystal substrate.

In a preferred embodiment the modulator and filter are formed on a single common crystal substrate.

More particularly, the common substrate for the modulator and filter consists of a lithium niobate crystal comprising at least one optical channel-shaped waveguide.

In a particular embodiment the modulator and filter are formed with a single common crystal substrate and the drivable modulator is a Mach-Zehner intensity modulator; alternatively, the drivable modulator is a phase modulator.

Preferentially, the optical-waveguide filter substrate is a crystal made of lithium niobate having a x-cut orientation and y propagation.

Still preferentially the common substrate for the acoustooptical filter and electrooptical modulator is a crystal made of lithium niobate having a x-cut orientation and y propagation.

In a preferred embodiment, the optical-waveguide monolithic filter comprises a temperature control and adjustment means rigidly connected to the crystal substrate; in particular, the temperature control and adjustment means comprises a Peltier cell.

In particular, the acoustooptical filter, both in an independent form and in combination with the electrooptical modulator, comprises an acoustic waveguide which is parallel to and overlaps the optical waveguide, of predetermined length, at one end of which a one way-transducer is present which is adapted to generate an acoustic wave in the presence of means for polarizing an optical signal guided within the optical waveguide.

In a preferred embodiment the laser cavity is in the form of a ring and preferably comprises at least one optoisolator.

In an alternative embodiment the laser cavity is of linear configuration and comprises optical reflection means at the respective ends thereof.

More details will appear from the following description, with reference to the accompanying drawings, in which.

Figure 1:
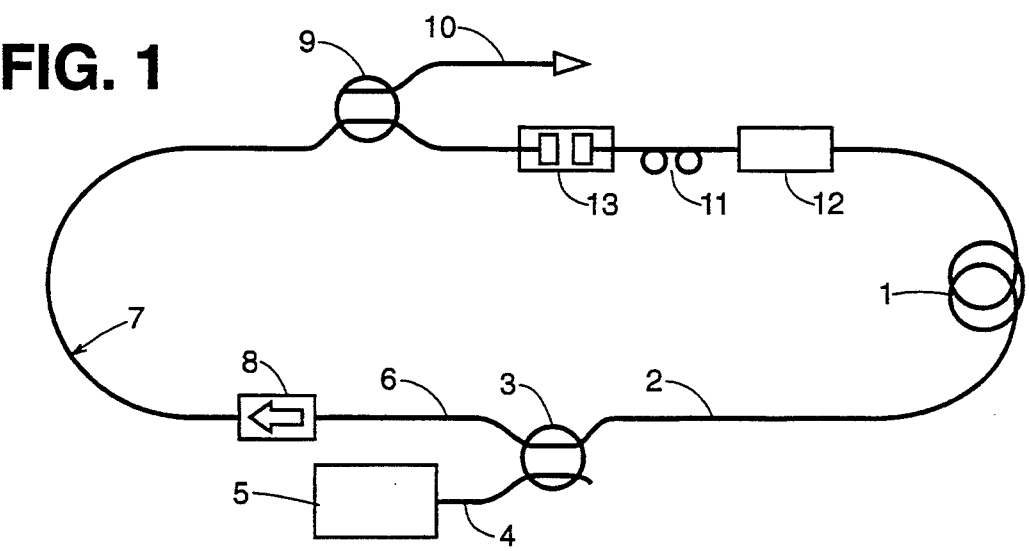
FIG. 1 is a general diagram of an active mode-locking laser device.

An optical-fibre active mode-locking laser is generally made according to the diagram shown in FIG. 1.

Such a laser comprises an active fibre 1 doped with a fluorescent substance, erbium for example, connected at one end thereof to the trailing fibre 2 of a dichroic coupler 3 having one leading fibre 4 connected to a pump laser 5 and a second leading fibre 6 connected to an optical-fibre ring 7, in which an optoisolator 8 and a directional coupler 9 through the trailing fibre 10 of which the generated signal is emitted, are inserted; a polarization controller 11 enables the polarization characteristics of the different fibres forming the ring or, more generally, the laser cavity to be compensated for.

The laser thus made acts through the feeding of luminous pump energy to the active fibre, at a wavelength adapted to excite to a laser emission state the fluorescent dopant contained in the active fibre; from such laser emission state said dopant can decay to a base state, with emission of a light signal to a predetermined wavelength both spontaneously and following passage through the fibre of a light signal of the same wavelength.

Such a light signal will travel through the active fibre a great number of times, by virtue of the laser cavity configuration and consequently it will be multiply amplified to a level sufficient to overcome losses, thereby generating a laser signal or emission signal that can be drawn out.

An electrooptical amplitude or phase modulator 12 is in addition inserted in the fibre Ping and enables operation of the active mode-locking laser to be carried out by virtue of an outer electric driving of appropriate frequency through a radio-frequency square or sine wave generator, not shown.

To the ends of the present description by radio-frequency it is intended a frequency of 100 MHz to 2-3 GHz or even higher.

In addition the laser may be tuned to the emission wavelength through a filter 13.

Such a filter in the known art typically consists of a Fabry-Perot filter, substantially comprising a pair of variable-index lenses connected to the ends of two optical fibres having two respective parallel and facing faces provided with reflecting coatings; the distance separating the two faces between which the signal is submitted to a variety of reflections generating a constructional interference at a wavelength depending on the distance itself, can be adjusted through drivable means such as piezoelectric elements, thereby enabling selection of the desired wavelength.

In a Fabry-Perot filter, however, the value of the distance between the reflecting faces and its constancy in time is very critical as it is subjected to alterations due to both temperature changes and vibrations and the like in the apparatus. This critical feature substantially connected with the lack of conservation of the relative position of the filter components, affects the overall laser operation because the outer perturbations modify both the ring sizes and filter features.

The above involves that for keeping the mode-locking in the laser it is necessary to periodically check and adjust the excitation frequency of the modulator and it also brings about the fact that the length of the emitted wave is not constant in time.

By way of example, a laser of the above type made in a laboratory with the use of a Fabry-Perot filter has required adjustments of the driving frequency of the electrooptical modulator every 15 minutes for maintaining the mode-locking operation, 3–4 KHz variations in the frequency modulation being provided.

The operating conditions in a laboratory, on the other hand, are much more constant and easier to compare than those that could be expected in the industrial practice, so that the laser thus constructed would not be appropriate for pratical uses, other than a mere experimentation.

For the purpose of ensuring a sufficient practical reliability to a device of the above type, in particular as far as its practical use is concerned, that is a use other than in a controlled laboratory environment, an efficient insulation and temperature control means of difficult accomplishment is required, as well as sophisticated backing and isolation systems for mechanical disturbances, optical devices for adjusting the distance between the reflecting filter surfaces and other similar devices.

Figure 2:
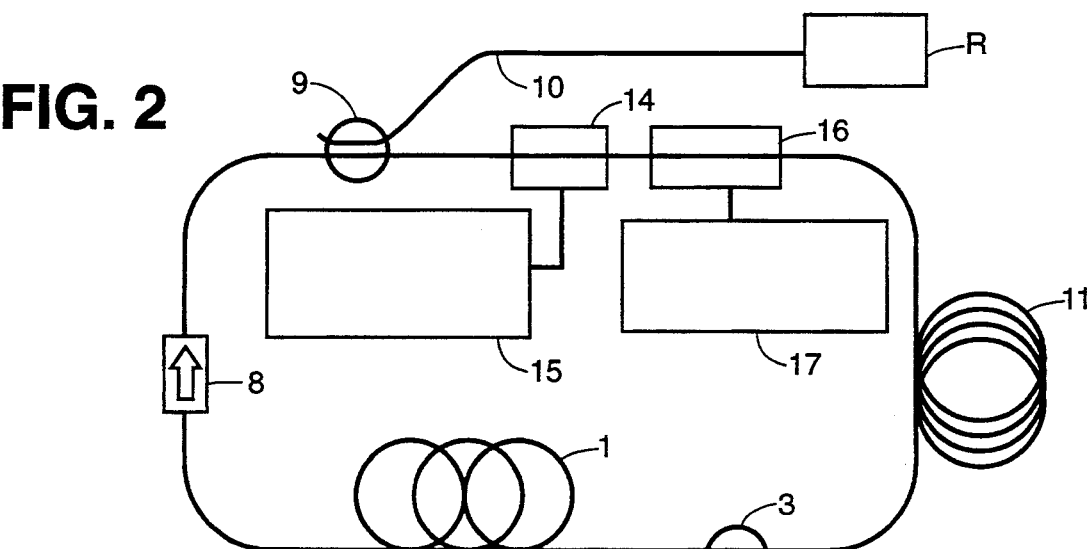
FIG. 2 is a diagram of an active mode-locking laser device in accordance with the invention.

A mode-locking laser in accordance with the invention, adapted to offer the required reliability for its practical use has been made with the configuration shown in FIG. 2 in which the components already described in the general structure seen in FIG. 1 are identified by the same reference numerals.

The laser comprises an erbium-doped active fibre 1, connected to a dichroic coupler 3 fed from a pump laser 5 acting at a 980 nm wavelength; the end of the active fibre 1 opposite the dichroic coupler 3 is connected, through an optoisolator 8 enabling one-way propagation in the ring, to the directional coupler 9 from the trailing fibre 10 of which the emitted signal is drawn; provision is also made for a polarization control element 11.

Mode-locking is achieved through an amplitude modulator 14, of the type providing for a Mach-Zehnder interferometer connected with an electronic radio-frequency (rf) pulse generator 15.

The emission wavelength is adjusted through an acoustooptical filter 16 in turn connected to a rf generator 17.

In the embodiment shown the optical fibre 10 issuing from the directional coupler 9 has been connected to a receiving apparatus R through which the laser emitted signals have been analyzed.

The overall length of the ring was about 20 m.

The features of the adopted active fibre 1 are the following:

| fibre length | 15 m; |
| fibre type | Si/Al; |
| Numerical aperture | NA = 0.2; |
| Cutoff wavelength | $\lambda_c = 900$ nm; |
| Erbium content in the core | 100 ppm |

The dichroic coupler 4 is a fused-fibre coupler formed with two mono-mode fibres of 980 and 1536 nm wavelength, the variation of the optical output power of which depending on polarization is <0.2 dB.

Dichroic couplers of the stated type are known and produced for example by Gould Inc., Fibre Optic Division, Baymeadow Drive, Glem Burnie, Md. (USA) and Sifam Ltd., Fibre Optic Division, Woodland Road Totquay Devon, (GB).

The pump laser 5 is a laser of a type known as "Strained Quantum Well", having the following features:

| Emission wavelength | $\lambda_p = 980$ nm; |
| Maximum optical output power | $P_u = 60$ mW. |

Lasers of the above type are for example produced by:
David Samoff Research Center, Washington Rd, Princetown, N.J. (USA).

The directional coupler 9 is a device adapted to divide an optical signal present at one of its inlets into predetermined proportions at the outlets thereof.

The directional coupler 9 is a coupler of a commercial type having a 50/50 division ratio, for example a model 1550 POH 50/50 2×2 produced by the above mentioned firm Gould Inc.

The optical fibers interconnecting the different components described are mono-mode optical fibers of the type 8/125 (where 8 represents the core diameter and 125 represents the cladding diameter of the fiber, reproduced in $\mu$m), the core being doped with germanium and having a numerical aperture NA=0.13.

The polarization control element 11 consists of several optical fibre coils disposed in succession and supported in an adjustable manner relative to a common alignement axis for carrying out the desired adjustment.

Devices of the above type are available from GEC MARCONI MATERIALS TECHNOLOGY Ltd., Caswell, Towcester Northants NN12 8EQ (Great Britain).

The optoisolator 8 is an optical isolator providing for polarization control of a type independent of the polarization of the transmission signal, in which isolation is greater than 35 dB and reflectivity lower than −50 dB.

The isolator used is a model MDL I-15 PIPT-A S/N 1016 available from ISOWAVE, 64 Harding Avenue, Dover, N.J., USA.

The receiving apparatus R consists of a non co-linear autocorrelator, model FR-1 3KR produced by FEMTO-CHROME INC., USA.

The emission band has been also measured through an optical spectrum analyzer; the apparatus used is model TQ8346 manufactured by AVANTEST, 300 Knightsbridge Parkway, Lincolnshire IL 60069 Illinois, USA.

The intensity modulator is a Mach Zehnder interferometer modulator having a channel-shaped waveguide made of lithium niobate (LiNbO3) and a traveling wave electrode of a commercially available type; the model used is produced by the applicant and put on sale under the brand name PIRMZM 15 3 00.

Figure 4:
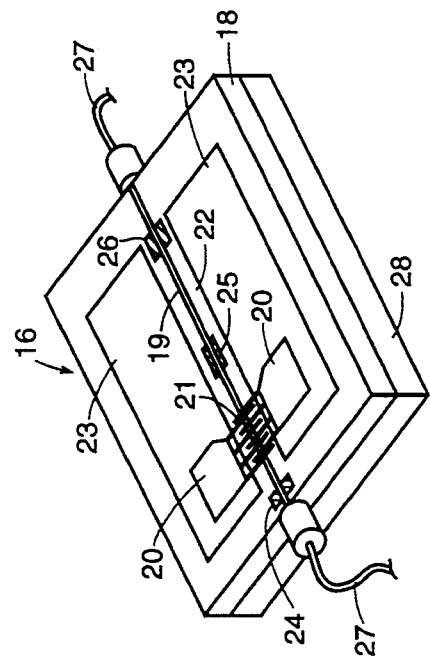
FIG. 4 is a perspective diagram of the planar optics filter shown in FIG. 3.
Figure 3:
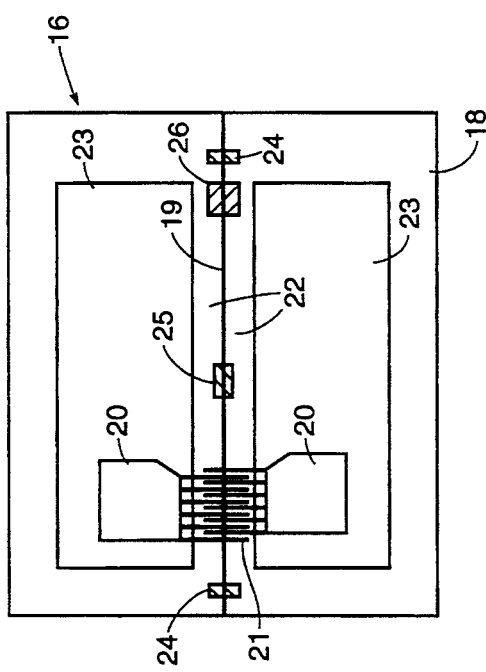
FIG. 3 is a plan view of a planar optics filter adapted to be applied to a laser in accordance with the invention.

The acoustooptical filter 16 is shown in detail in FIGS. 3 and 4.

As viewed from the figures, the filter 16 is formed from a substrate 18 consisting of a LiNbO3 x-cut crystal on which an optical channel-shaped waveguide 19 having a y-propagation orientation and being mono-mode in the emission wavelength band, has been made by diffusion of titanium, thanks to which the refraction index of the subtrate lithium niobate is locally increased so as to confine the optical signal within the required path.

Along the optical waveguide 19 a pair of acoustooptical transducers 20 is present, which consist of metal plates having several comb-shaped electrodes alternated with each other and overlapping the waveguide, adapted to generate, by piezoelectric effect, a sound wave propagated in the crystal, as a result of an electrical excitation applied thereto.

An acoustic waveguide 22 is defined on the sides of the optical waveguide 19; it is bounded by two side areas 23 in which titanium is diffused in the lithium niobate substrate, in order to increase the propagation speed of a sound wave in such side areas relative to the central area 22, so that the sound wave is guided into said central area.

A polarizer 24 of the TE feedthrough type is present upstream of the electrodes 21, whereas a polarizer 25 of the TM feedthrough type is present downstream of the electrodes 21.

The TE feedthrough polarizer 24 is composed of a dielectric material (such as silicon oxide) layer of predetermined thickness applied to the optical waveguide 19 on which a metal layer is overlaid; this polarizer enables the polarized light signal component to pass in the plane of the LiNbO3 crystal surface.

The TM feedthrough polarizer 25 is in turn composed of two protonic exchange areas made sideways of the waveguide over some millimeters in length; this polarizer enables the polarized light signal component to pass in a plane orthogonal to the LiNbO3 crystal surface.

A sound absorber 26 is present at a predetermined distance from the TM feedthrough polarizer 25, on the opposite side with respect to the electrodes 21; it consists of a sound absorbent material layer applied to the crystal surface, adapted to absorb the acoustic wave and therefore prevent it from further interaction with the light wave.

As diagrammatically shown in FIG. 4, connected to the ends of the waveguide 19 are interconnecting fibres 27 by which the filter is connected to the remaining laser components.

The rf generator 15 driving the intensity modulator, had a selectable frequency ranging between 100 mHz and 2.4 GHz, in relation to the desired emission frequency of the optical pulses generated by the laser (equal to the frequency of generator 15) and the characteristics of the laser cavity, which possesses a fundamental (transit) frequency of its own of which the excitation frequency must be a multiple; the frequency used in the experiment described was approximately 635 MHz.

The rf generator 17 driving the acoustooptical filter in turn had a selectable frequency ranging between 170 MHz and 180 MHz, for selecting the wavelength of the optical laser pulses in the desired field (1530 $<\lambda<$ 1560).

Preferably the intensity modulator is employed at frequencies higher than 300 MHz, both in order to have pulses provided with the best features particularly in terms of pulse shortness and constancy, and in view of the desired applications, in particular for high speed telecommunications.

The acoustooptical filter was provided with a heat control and adjustment device 28, which has not been turned on during the experiment and the whole laser assembly has been tested at room temperature.

The laser having the described structure has been set in operation in a laboratory and has shown a steady operation, emitting pulses at regular intervals over all the wavelengths in the selected wavelength field (between 1530 and 1560 nm), an adjustment of the emission frequency of the rf generator 15 lower than 1 KHz being required after eight hours of continuous operation, for the purpose of optimizing the profile of the emitted pulses only; the tested emission wavelengths have been steady within 0.1 nm—corresponding to the resolution of the spectrum analyzer.

Although it has not been expressly recorded, the temperature in the environment in which the laser has been tested is deemed to have oscillated in the range of ±2° C. relative to an average value of 21° in the progress of the test, while at the same time no particular measures have been adopted for eliminating or restraining the mechanical disturbances.

Figure 5:
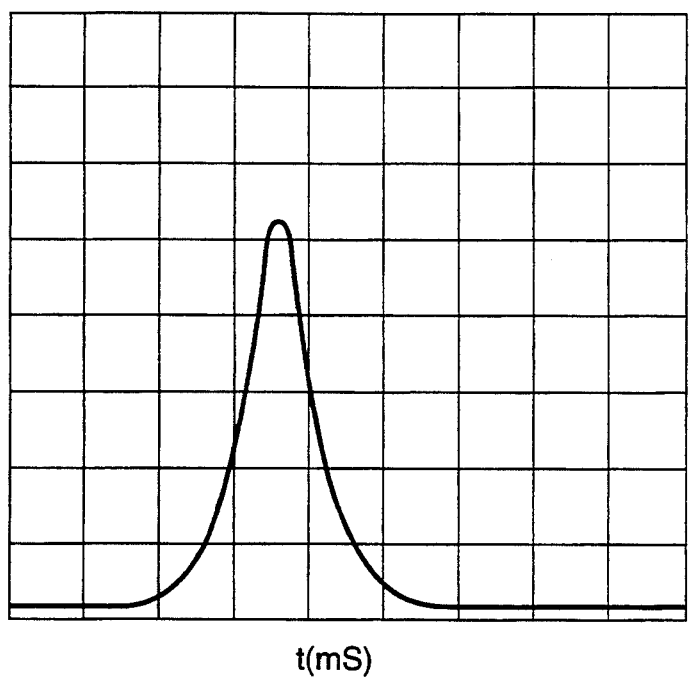
FIG. 5 is a diagram showing the autocorrelation figure of the laser of the invention to a selected wavelength.
Figure 6:
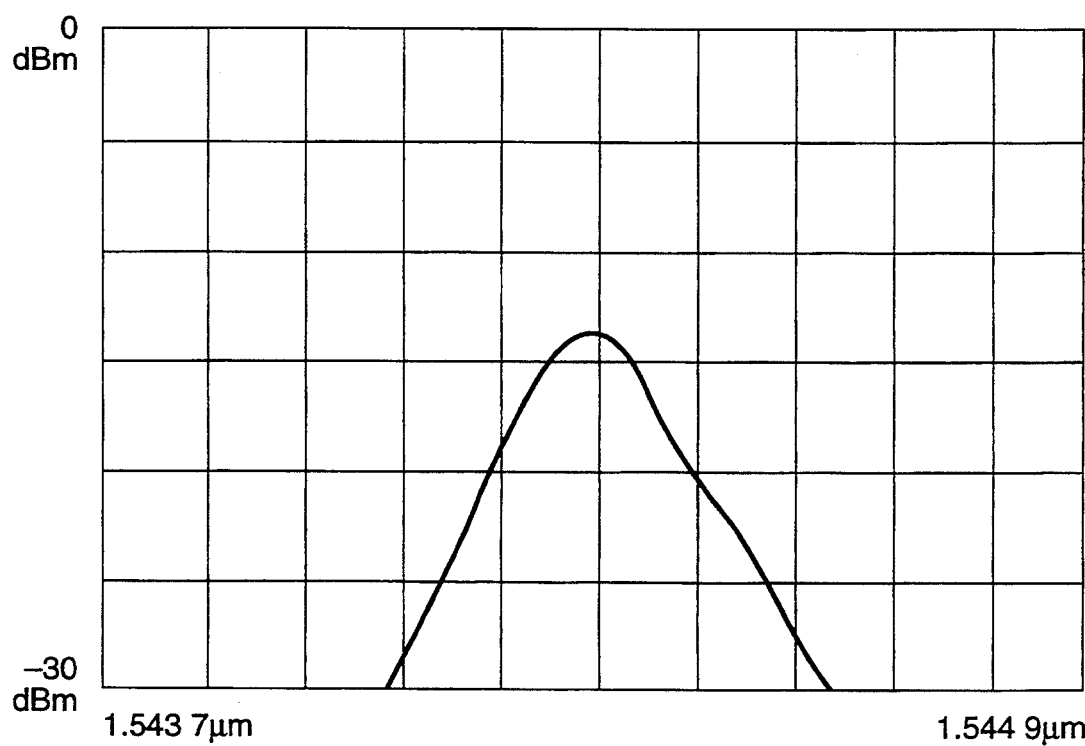
FIG. 6 shows the emission spectrum to the wavelength of the diagram seen in FIG. 5.

An autocorrelation figure for a pulse and the relevant spectrum for one of the selected wavelengths are shown in FIGS. 5 and 6, respectively.

The following Table 1 reproduces, by way of example only, some of the selected emission wavelengths and the relevant driving frequencies of the electrooptical modulator and acoustooptical filter.

A person skilled in the art will readily understand that the indicated frequencies correspond to the structure of the experiment described and that for other different structures of the assembly and relevant components different frequencies are required for achieving the same results.

TABLE 1

| Mode-locking frequency (MHz) | Filter frequency (MHz) | Emission wavelength (nm) |
| --- | --- | --- |
| 635.693 | 177.092 | 1532.8 |
| 635.691 | 176.492 | 1538.5 |
| 635.689 | 175.492 | 1546.5 |
| 635.688 | 174.792 | 1552.0 |
| 635.686 | 173.992 | 1558.3 |

As is apparent from the foregoing the test laser has given far better results in terms of reliability and performance constancy than the known art; in order to further increase the operating stability of the laser, particularly in view of its possible use in environments submitted to important temperature oscillations, it should be convenient to turn on the thermoregulation device 28 applied to the acoustooptical filter comprising a Peltier cell, a heat sensor and the relevant regulation circuit, by which the filter temperature can be maintained constant in a very precise manner even in the presence of important environmental temperature changes.

It is noted that also the monolithic structure and the reduced sizes of the filter the overall length of which does not exceed a few centimeters and the thickness and width of which are in the order of a few millimeters, enable its temperature to be easily controlled both by a heat insulator and by the thermoregulation device.

The polarization control element 11 has been utilized in the laser of the described example in order to compensate for the signal polarization variations caused by the fibres and components used for producing the laser; however if polarization-maintaining fibres and components are used in the laser the polarization element 11 can be eliminated.

Figure 7:
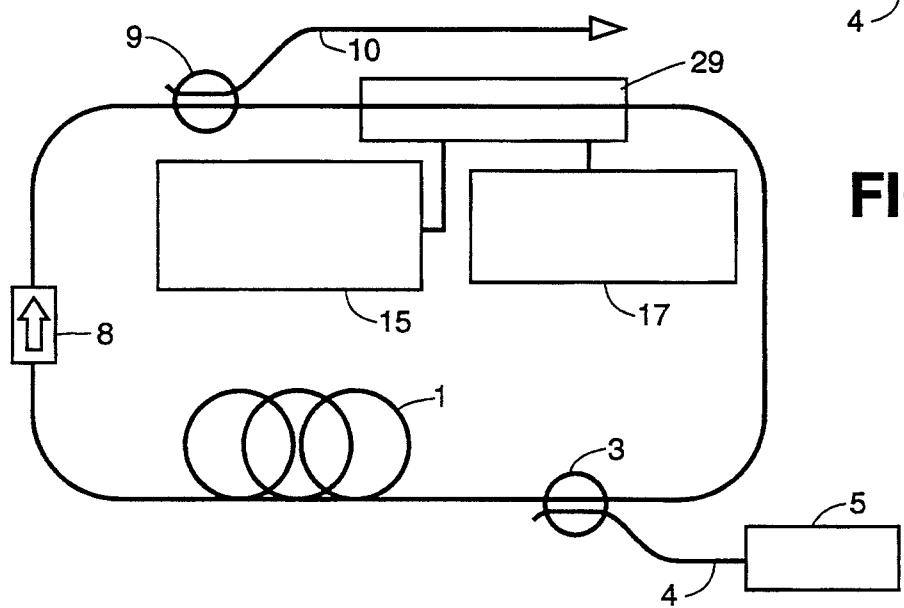
FIG. 7 is a diagram of the laser device according to an alternative embodiment of the invention.
Figure 8:
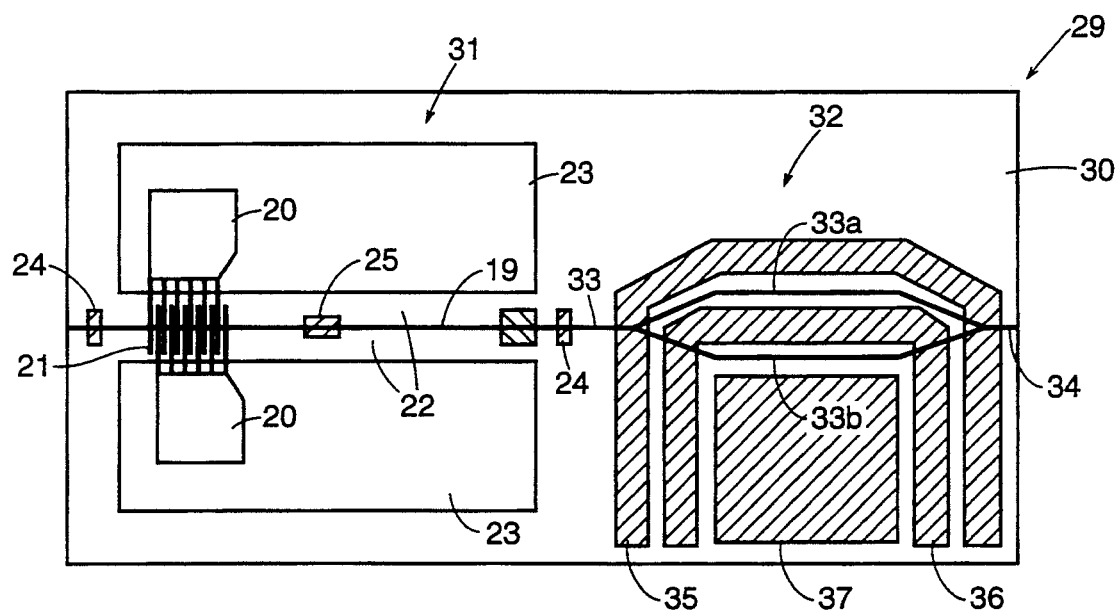
FIG. 8 is a plan view of an integrated element including a filter and an amplitude modulator for the laser seen in FIG. 7.
Figure 9:
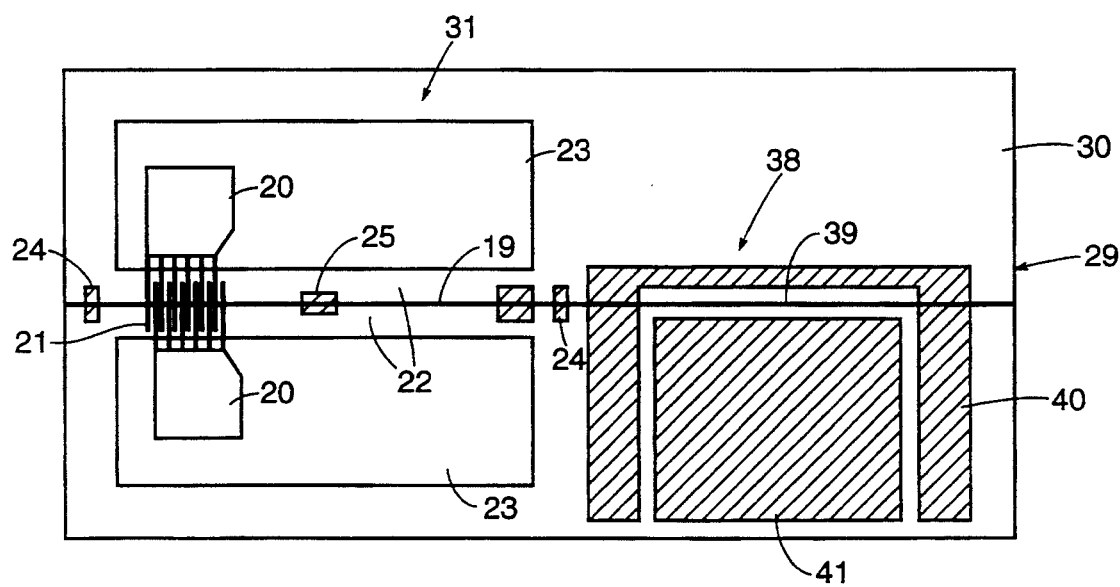
FIG. 9 is a plan view of an integrated element comprising a filter and phase modulator for the laser seen in FIG. 7.

In addition, the use of an acoustooptical integrated-optics filter enables the filter and modulator, in a further embodiment capable of offering further advantages, to be made of a single planar-optics element 29, as shown in FIGS. 7, 8, 9.

As shown in FIG. 8, on a single substrate 30 consisting of a x-cut lithium niobate crystal, having a y-propagation direction, there is a portion 31 forming the acoustooptical filter the components of which are identified by the same reference numerals used in FIG. 3 and to the description of which you may refer and, consecutive thereto, a portion 32 forming an electrooptical modulator having a Mach-Zehnder interferometer, thereby constituting an integrated modulation and tuning assembly.

In the portion forming the modulator 32, the optical waveguide 33 forming the extension of the waveguide 19 of filter 31 is divided into two portions 33a and 33b which are subsequently joined together at the output end 34 of the modulator.

The electrodes 35, 36, 37, alternately connected to the outputs of the electronic rf generator 15 generate, by an electrooptical effect, a phase displacement between the two portions into which the signal has been divided, so that, on joining, the desired intensity modulation is caused by interference.

The integrated embodiment described enables the laser structure to be greatly simplified, in particular by virtue of the fact that it enables the number of connections necessary between the fibres and various components to be reduced.

The above is particularly useful when polarization-maintaining fibres are used for making the laser, as in the diagram shown in FIG. 7 which is devoid of polarization equalizers. In fact, for such fibres, due to the complexity of the welding operations needed for achieving properly aligned splices in the polarization plane, it is advisable to reduce to the minimum the number of the required weldings.

According to a further convenient embodiment of the invention shown in FIG. 9, the electrooptical modulator integrated in a single substrate in the assembly 29 may consist of a phase modulator 38; this phase modulator is formed with an optical waveguide 39 made in the extension of the waveguide 19 in the substrate 30 crystal, and alongside it there are the electrodes 40, 41 connected to the rf generator 15.

According to the known optics principles, the electric signals applied to the electrodes 40, 41 modify the light propagation features within the optical waveguide 39 which result in a phase modulation of the optical signal that propagates in the waveguide itself.

This modulation introduces a linearly increasing phase displacement between the modes generated in the laser and causes the locking thereof, thereby giving rise to the desired very short pulses.

The acoustooptical filter, both in the separated form and in the form integrated with the electrooptical modulator, may preferentially comprise a second TE feedthrough polarizer 24, shown into brackets in FIGS. 3, 8, 9, adapted to enable passage of the desired polarization state alone, eliminating possible residual components; in another alternative embodiment, should the fibres forming the laser cavity be capable of efficiently maintaining the polarization state, the TE feedthrough polarizer could be omitted.

To the ends of the present invention the optoisolator 8 and polarization selector 11, if any, can be disposed within the laser cavity; the pump laser 5 too and the relevant dichroic coupler 3 can be disposed in connection with either end of the active fibre 1, provided that the pumping energy can be supplied to the active fibre itself without important attenuations.

Figure 10:
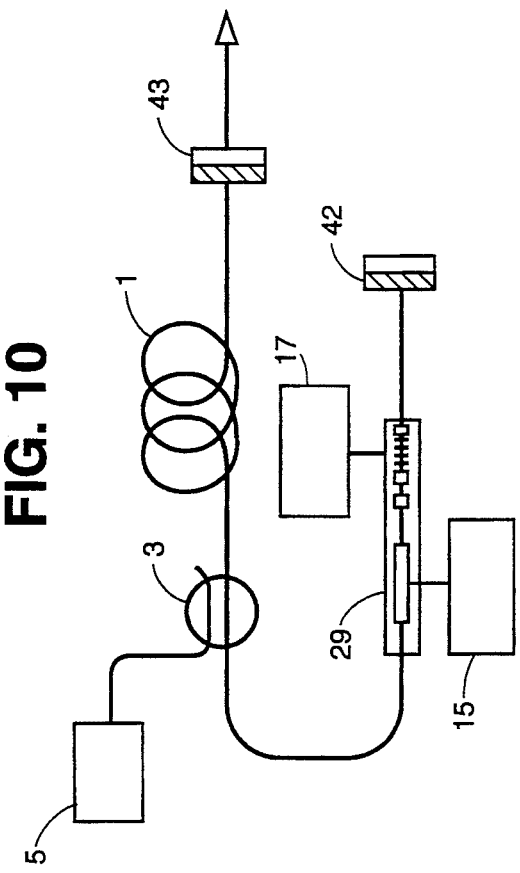
FIG. 10 is a diagram of the laser device according to a further embodiment of the invention.

While the present description refers to a fibre laser of the ring type which constitutes a preferential embodiment of the invention, the invention also applies to lasers of different configuration, such as the one shown by way of example in FIG. 10 in which the laser cavity is of the linear type.

In this embodiment an active fibre 1 is inserted in a laser cavity bounded by a high-reflectivity mirror 42 and a part reflecting output coupler 43; the pump laser 5 feeds the active fibre 1 through the coupler 3 and the integrated modulation and tuning assembly 29, together with the relevant rf generators 15, 17, is put into the laser cavity defined by the reflecting elements 42 and 43.

The assembly 29 in analogy with the above description, may be replaced by an electrooptical modulator and an acoustooptical filter separated from each other.

It will be also recognized by a person skilled in the art that tunable filters having different configuration than the one described fall within the scope of the present invention, as well as possible different modulator configurations, provided that the modulator is adapted to generate active mode-locking pulses devoid of elements subjected to spatial movements which are susceptible of undergoing or causing accidental deformations of their own spatial configuration and the size of the laser cavity in which they are fitted.

We claim:

1. An active-mode-locking pulse laser generator comprising:
   an active fibre doped with a fluorescent dopant;
   means for feeding luminous pumping energy to an end of said active fiber, said luminous pumping energy causing the fluorescent dopant to be excited to a laser emission state from which it decays to a lower state with the emission of a light energy signal at a predetermined wavelength;
   an externally drivable electro-optical modulator and an externally drivable wavelength selecting filter connected in series with each other and one of said modulator and said filter being connected to said active fiber for receiving said light energy signal from said active fiber and for, respectively, modulating and filtering said light energy signal; and feedback means connected to the other of said modulator and said filter for receiving at least a portion of said light energy signal which has passed through said modulator and said filter and for returning said portion of said light signal energy to said active fiber and thereby causing mode-locking of said light energy signal;
characterized in that said filter comprises a monolithic optical-waveguide on a crystal substrate and having no spatially movable components thereby providing light signal energy emission stability.

2. An active-mode-locking pulse laser generator according to claim 1, characterized in that said fluorescent dopant in the active fibre is erbium.

3. An active-mode-locking pulse laser generator according to claim 1, characterized in that the means for feeding pumping energy comprises a dichroic coupler connected to one end of the active fiber and to a pumping laser for supplying luminous energy of a predetermined wavelength.

4. An active-mode-locking pulse laser generator according to claim 1, characterized in that the electrooptical drivable modulator is a Mach-Zehnder intensity modulator having an optical channel-shaped waveguide and coupled to an electronic preselectable-frequency generator.

5. An active-mode-locking pulse laser generator according to claim 1, characterized in that the drivable electroptical modulator is a phase modulator having an optical channel-shaped waveguide and coupled to an electronic preselectable-frequency generator.

6. An active-mode-locking pulse laser generator according to claim 1, characterized in that said wavelength selecting filter is an acoustooptical filter.

7. An active-mode-locking pulse laser generator according to claim 6, characterized in that the acoustooptical filter is a filter having an optical channel-shaped waveguide formed in a lithium niobate crystal substrate.

8. An active-mode-locking pulse laser generator according to claim 7, characterized in that the optical-waveguide filter substrate is a crystal made of lithium niobate having a x-cut orientation and y propagation.

9. An active-mode-locking pulse laser generator according to claim 7, characterized in that said acoustooptical filter comprises an acoustic waveguide which is parallel to and overlaps said optical waveguide, a one-way transducer for generating an acoustic wave is coupled to said acoustic waveguide at one end thereof and means in series with said optical waveguide for polarizing an optical signal guided within the optical waveguide.

10. An active-mode-locking pulse laser generator according to claim 1, characterized in that the modulator and filter are formed on a single common crystal substrate.

11. An active-mode-locking pulse laser generator according to claim 10, characterized in that the common substrate for the modulator and filter comprises a lithium niobate crystal comprising at least one optical channel-shaped waveguide.

12. An active-mode-locking pulse laser generator according to claim 11, characterized in that the common substrate for the acoustooptical filter and electro-optical modulator is a crystal made of lithium niobate having a x-cut orientation and y propagation.

13. An active-mode-locking pulse laser generator according to claim 10, characterized in that the drivable modulator is a Mach-Zehner intensity modulator.

14. An active-mode-locking pulse laser generator according to claim 10, characterized in that the drivable modulator is a phase modulator.

15. An active-mode-locking pulse laser generator according to claim 10, characterized in that said acoustooptical filter comprises an acoustic waveguide which is parallel to and overlaps said optical waveguide, a one-way transducer for generating an acoustic wave is coupled to said acoustic waveguide at one end thereof and means in series with said optical waveguide for polarizing an optical signal guided within the optical waveguide.

16. An active-mode-locking pulse laser generator according to claim 1, characterized in that said crystal substrate of said monolithic optical-waveguide is rigidly connected to a temperature control and adjustment means.

17. An active-mode-locking pulse laser generator according to claim 16, characterized in that the temperature control and adjustment means comprises a Peltier cell.

18. An active-mode-locking pulse laser generator according to claim 1, characterized in that said feedback means comprises an optical fiber interconnecting said other of said modulator and said filter and said active fiber.

19. An active-mode-locking pulse laser generator according to claim 18, characterized in that said generator further comprises at least one optoisolator connected in series with said active fiber and between said active fiber and said one of said modulator and said filter.

20. An active-mode-locking pulse laser generator according to claim 1, characterized in that said feedback means comprises a first optical reflection means coupled to the output of said other of said modulator and said filter for reflecting said portion of said light energy signal back to said other of said modulator and said filter and hence, into said active fiber at one end thereof, and a second optical reflection means coupled to the other end of said active fiber for reflecting energy of said light energy signal into said other end of said active filter.

21. An active-mode-locking pulse laser generator according to claim 1, characterized in that the modulator and filter are formed on a single common crystal substrate.

22. An active-mode-locking pulse laser generator comprising:
an active fiber doped with a fluorescent dopant;
means for feeding luminous pumping energy to an end of said active fiber, said luminous pumping energy causing the fluorescent dopant to be excited to a laser emission state from which it decays to a lower state with the emission of a light energy signal at a predetermined wavelength;
an externally drivable electro-optical modulator and an externally drivable wavelength selecting filter connected in series with each other and one of said modulator and said filter being connected to one end of said active fiber for receiving said light energy signal from said active fiber and for, respectively, modulating and filtering said light energy signal; and
feedback means connected to the other of said modulator and said filter for receiving at least a portion of said light energy signal which has passed through said modulator and said filter and connected to the other end of said active fiber for returning said portion of said light signal energy to said other end of said active fiber and thereby causing mode-locking of said light energy signal;

characterized in that said filter comprises a monolithic optical-waveguide on a crystal substrate and having no spatially movable components thereby providing light signal energy emission stability.

23. An active-mode-locking pulse laser generator according to claim 22, characterized in that the modulator and filter are formed on a single common crystal substrate.

24. An active-mode-locking pulse laser generator comprising:
- an active fiber doped with a fluorescent dopant;
- means for feeding luminous pumping energy to an end of said active fiber, said luminous pumping energy causing the fluorescent dopant to be excited to a laser emission state from which it decays to a lower state with the emission of a light energy signal at a predetermined wavelength;
- an externally drivable electro-optical modulator and an externally drivable wavelength selecting filter connected in series with each other and one of said modulator and said filter being connected to said active fiber for receiving said light energy signal from said active fiber and for, respectively, modulating and filtering said light energy signal; and
- feedback means connected to the other of said modulator and said filter for receiving at least a portion of said light energy signal which has passed through said modulator and said filter and for returning said portion of said light signal energy to said active fiber and thereby causing mode-locking of said light energy signal;

characterized in that said filter comprises a monolithic optical-waveguide on a crystal substrate and having no spatially movable components thereby providing light signal energy emission stability, said feedback means comprising a first optical reflection means coupled to the output of said other of said modulator and said filter for reflecting said portion of said light energy signal back to said other of said modulator and said filter and hence, into said active fiber at one end thereof, and a second optical reflection means coupled to the other end of said active fiber for reflecting energy of said light energy signal into said other end of said active fiber.

* * * * *

UNITED STATES PATENT AND TRADEMARK OFFICE
CERTIFICATE OF CORRECTION

PATENT NO. : 5,381,426
DATED : January 10, 1995
INVENTOR(S) : Fontana et al

It is certified that error appears in the above-indentified patent and that said Letters Patent is hereby corrected as shown below:

Col. 4, line 61, change "Ping" to --ring--;
Col. 5, line 18, "This critical" should read as a new paragraph;
Col. 6, line 25, change "Tot" to --Tor--; and
Col. 7, line 10, change "applicant" to --by the assignee of this application--.

Signed and Sealed this

Sixth Day of June, 1995

Attest:

BRUCE LEHMAN

Attesting Officer    Commissioner of Patents and Trademarks